UNITED STATES PATENT OFFICE.

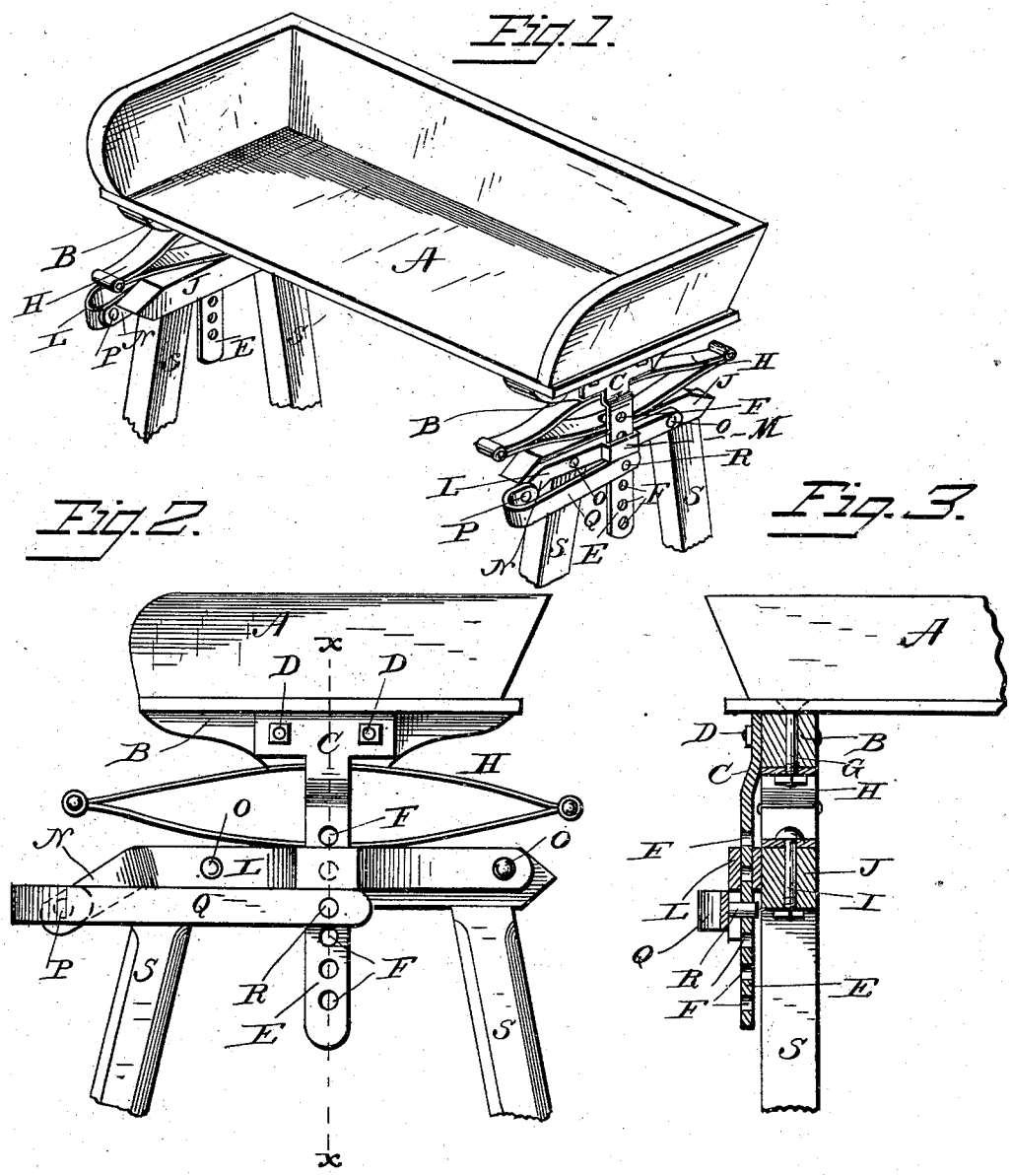

DYAS SHELTON, OF SANTA ROSA, CALIFORNIA.

VEHICLE-SPRING ATTACHMENT.

SPECIFICATION forming part of Letters Patent No. 263,066, dated August 22, 1882.

Application filed June 12, 1882. (No model.)

*To all whom it may concern:*

Be it known that I, DYAS SHELTON, a citizen of the United States of America, residing at Santa Rosa, in the county of Sonoma and State of California, have invented certain new and useful Improvements in Vehicle-Seat-Spring Attachments, of which the following is a specification, reference being had therein to the accompanying drawings.

My invention relates to vehicle-seat springs.

It consists in a T-shaped metallic bar, the horizontal piece thereof being provided with slots to receive the bolts by means of which the bar is rigidly secured to the side of the seat-block. The seat rests on and is secured to the block, the block resting on and being bolted to the top of the spring. The vertical part of the T-shaped bar is provided with a series of slots in a perpendicular line. This slotted vertical bar fits in the slot of a horizontal plate, said plate having end slots for the reception of screws which secure it to the outside of a horizontal block, said block being supported by standards which are attached to the side or rest on the bed of the vehicle. A projection is formed on the forward end of the horizontal plate, which extends downward and outward at about an angle of forty-five degrees. To this projection is pivoted the bent end of a hook-shaped bar or tongue. A stud is fixed on the inner side of the loose end of the tongue. Said tongue is in the nature of a spring, with an inward tendency, so that the stud on the inner forward side thereof can be inserted into any one of the slots in the vertical part of the T-shaped bar. The stud can be easily forced out of a slot by simply pressing the tongue outward, all of which will be more fully hereinafter set forth.

The object of my invention is to protect the seat-springs and cause the seat to occupy a perfectly level or horizontal position at all times, irrespective of the distribution of weight on its surface.

It is a well-known fact that when one person occupies the side of a spring-seat the side on which he sits is depressed below the opposite side, thus causing him to assume an uncomfortable and unsafe position, and producing an unequal pressure on the springs, and rendering them liable to break by being thrown sidewise out of the perpendicular.

My invention obviates these defects in the following manner: Supposing the driver to be the sole occupant of the vehicle, which is usually the case with a wagon, he would, by custom and for convenience, sit on one side of the seat. This would necessarily force his side to sink below the opposite side, and thus cause the seat to represent an inclined plane. By permitting his body to rest for an instant on the side opposite where he desires to sit the spring of the side on which he is so resting will be depressed, and thereby cause the vertical part of the T-shaped bar to slide downward through the slot in the horizontal plate to an extent equal to the spring's depression. With one hand he is then enabled to withdraw the stud on the tongue from the slot it may occupy in the vertical bar and place said stud in the first slot immediately below the horizontal plate. The stud resting immediately under the horizontal plate thus operates as a lock for the seat-spring and prevents said spring from returning to its normal position so long as the stud remains in the slot. By then moving to the side on which he has chosen to sit the springs will be equally depressed or balanced and the seat carried in a perfectly horizontal position.

My device can be placed on both sides of the seat, so as to depress either one or both sides at pleasure.

In the accompanying drawings, Figure 1 represents a perspective view of a vehicle-seat equipped on each side with my invention. Fig. 2 is an elevation of one side of the seat with my device attached. Fig. 3 is a vertical section through the line $x\ x$ of Fig. 2.

The letter A represents the seat secured to block B. Said block is secured to and rests on the springs.

C is the T-shaped bar.

D D are screws passing through the slots in the top of bar C, and by means of which said bar is secured to block B.

E is the vertical piece of bar C, having slots F F therein.

G G are the bolts, rigidly uniting the elliptic spring H, block B, and seat A. The heads of the bolts are countersunk in the top of the seat and secured by nuts on their threaded ends immediately under the top plate of the spring.

I I are the bolts passing through the lower part of the spring and standard-block J, and by means of which said spring and block are united.

L is a horizontal plate, having a slot, M, therein to receive the vertical end of bar C. The bar E moves freely in slot M.

N is a forward projection formed on the end of plate L.

O O are end slots in plate L for the reception of screws, and by means of which said plate is secured to the standard-block J.

P is the point at which the adjustable tongue Q is pivoted to the extension N of plate L.

R is the stud, rigidly fixed to the inner side of tongue Q. This stud can be inserted into and withdrawn from any one of the series of slots F F in the vertical bar E that may be pressed below the plate L. By depressing the seat-spring the vertical slotted bar E is forced downward through slot M in the plate L, and an opportunity thereby afforded the driver to lock the spring in its depressed condition by simply inserting the stud R into one of the slots F F.

Having thus described my invention, I claim as new and desire to secure by Letters Patent—

1. The seat A and block B, said block resting on the springs and having the T-shaped bar C secured to its outer side, in combination with the block J, plate L, and extension N, the plate L being secured to block J, and provided with slot M for the reception of the vertical slotted end E of the bar C, substantially as described, and for the purposes set forth.

2. The seat A, block B, bar C, springs H, block J, standards S, and plate L, said plate having slot M therein, in combination with the adjustable tongue Q, pivoted at P to the extension N, said tongue being provided on its inner side with locking-stud R, arranged to engage the slots F in bar E, substantially as specified, and for the purposes set forth.

3. The horizontal plate L, having vertical slot M, said plate being provided with end slots, O, for the reception of screws to secure it to block J on standard S, in combination with the tongue Q, pivoted to extension N, and having stud R on its inner side, substantially as described, and for the purposes set forth.

In testimony whereof I affix my signature in presence of two witnesses.

DYAS SHELTON.

Witnesses:
JNO. T. CAMPBELL,
ALBERT G. SHANNON.